Aug. 23, 1927.

C. P. BETTENGA 1,640,139

FEEDER FOR LIQUID FOODS

Original Filed July 18. 1925

Inventor

Creno P. Bettenga

By G. C. Kennedy

Attorney

Patented Aug. 23, 1927.

1,640,139

UNITED STATES PATENT OFFICE.

CRENO P. BETTENGA, OF MARSHALLTOWN, IOWA, ASSIGNOR TO MARSHALLTOWN SHEET METAL WORKS, OF MARSHALLTOWN, IOWA.

FEEDER FOR LIQUID FOODS.

Application filed July 18, 1925, Serial No. 44,608. Renewed April 7, 1927.

My invention relates to improvements in feeders for liquid foods, and the object of my improvement is to furnish a device of this character of compactly housed construction, provided with manually operable rotatable supply tank and a basin to receive liquid food therefrom, said basin having means for the heating of its contents when desired.

This object I have accomplished by the means which are hereinafter described and claimed, and which are illustrated in the accompanying drawings, it being understood that changes in the precise embodiment of invention herein disclosed can be made within the scope of what is claimed without departing from the spirit of the invention.

Figure 1:
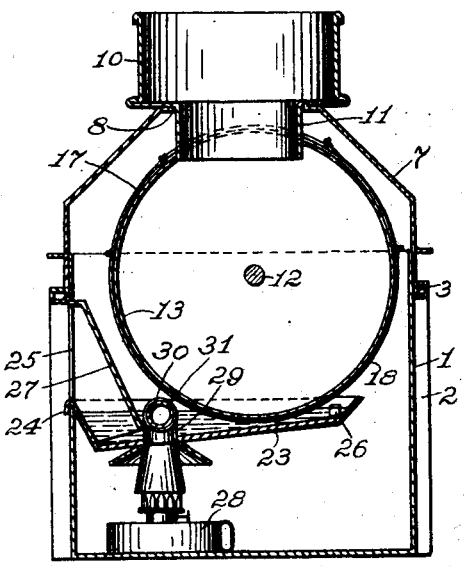
Figure 2:
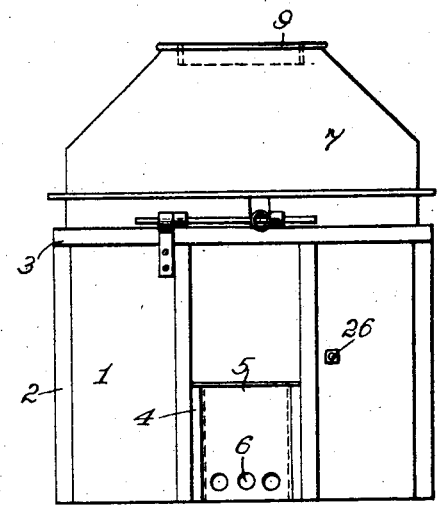
Figure 3:
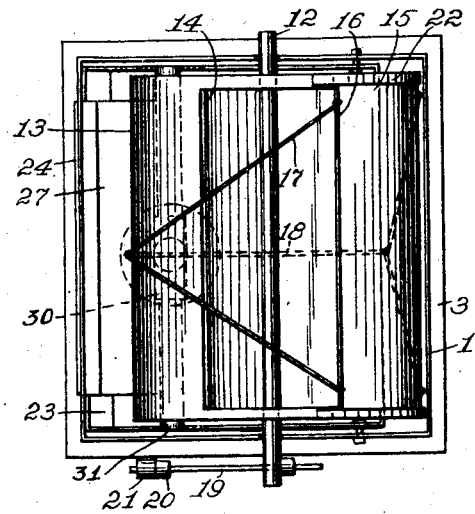
Figure 4:
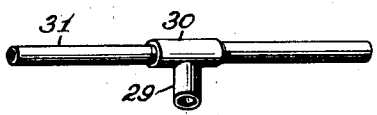

In said drawings, Fig. 1 is a medial vertical transverse section of my improved feeder, showing the rotatable tank and hopper in coacting positions. Fig. 2 is an end elevation of the housing of the device, with the cover and the cover closure in place. Fig. 3 is a top plan of the device with the cover removed. Fig. 4 is a detail perspective view of the T-shaped heat distributer as separated from the open top basin or feed container.

The invention may be used for the feeding of liquid food to animals or poultry, and therefore may be variously shaped in its related parts and of different dimensions as necessary.

The liquid feed may be a mixture of ingredients in a flowable form according to the requirements, and the device is therefore designed to supply such feed without clogging, waste, or contamination.

The numeral 1 denotes an open top hollow housing having a top cover 7 of arched shape, the latter having a top aperture 8 which may usually be closed by a flanged stopper 9 of a well-known type.

The side walls of the housing may be reinforced by hollow vertical struts 2 and at the tops of the latter by a circumferential hollow beam body 3. One side wall of the housing has an opening 25 for the introduction of the head of an animal or fowl while feeding from the contents of a shallow open top basin 23 within the housing, and which has a lip 24 recurved to hang it upon the lower edge or wall of the opening port 25, while the opposite part of the container is maintained in a position where its bottom is inclined toward said opening by means of bolts 26 traversing the end walls of the housing. A hood 27 may be mounted within the housing and said container to partition the feeding space of the latter and inclose the remainder of the container from communication with the atmosphere without.

The numeral 13 denotes a hollow closed cylindrical tank mounted upon an axis spindle 12 within the housing and above the open top of the container 23, the ends of the spindle being removably seated rotatably in notched bearing seats in the upper margin of the housing part or body 1 above the beam part 3.

The tank 13 has an opening in its circumferential wall which extends approximately its whole length. This is a plain rectangular opening, unrimmed, and at its ends are fixed spaced arcuate guide plates 22 to seat between them a curvate sliding closure 15 for said opening, and which may have at its side edges slightly raised flanges 16 perforated to receive the fastened terminations of flexible loops of wire or cord 17. The middles of said loops are connected by a flexible wire or cord 18 extending circumferentially around the tank, but slack enough to permit of fingering it, whereby the cord and loops may be manually pulled to and fro to correspondingly shift the closure 15 to thus open or close the opening 14 of the tank when desired.

In one end of the spindle 12 is a transverse hole in which is slidably mounted a hand-crank 19 having spaced from its ends the fixed stop collars 20. An apertured bracket body 21 is fixed on an end wall of the housing to receive either end of the hand-crank 19 slidingly. This hand-crank thus cooperates with said bearing body 21 to hold the tank 13 in either of diametrically opposite positions, with the opening 14 either beneath the cover opening 8 to receive from a hopper 10 seated in the latter opening to deliver into the opening 14, or with the opening 14 within the container 23 and in all its length below the level or at the level of the liquid food in the container.

When the tank 13 has been filled with liquid feed, the hopper 10 is removed, and the flexible shifting means 17—18 used to close the closure 15 to tightly cover the opening 14. The hand-crank 19 is then slidably disengaged from its bracket bearing 21, and the tank rotated one half a revolution to submerge the opening 14 in the container 23, or at least be below the walls thereof. Then the shifting means is used to open the closure, so that enough of the contents may be discharged from the tank into the container to bring the contents of the latter level with the delivery edges of the opening 14, the rest of the contents of the tank being maintained therein by reason of the induced vacuum in the tank and until the contents are exhausted.

I have provided means for warming the interior of the housing in cold weather and also heating the contents of the container 23. This consists of a T-shaped tubular distributer mounted within the container 23 and having a depending part or stem sealed within and traversing the bottom of the container to receive heated gases of combustion or heated air from a lamp 28 or other heating-means placed below within the housing. This depending stem 29 may be integral with a T-body 30 in whose ends are fixed tubes 31 whose terminations are sealed in and traverse openings in opposite end walls of the container to deliver the heated gases without the latter and into the hollow of the housing to circulate hence about the tank 13. The tubular parts and stem of said distributer are preferably partially or wholly submerged within the contents of the container to suitably warm the latter. The distributer is preferably placed close to the lower part of the hood 27 in the deeper part of the container nearest the fount, facilitating the warming of the contents at the feeding place.

The large opening 14 in the tank 13 and its being positioned completely within the container in a delivery position, affords complete and certain delivery of liquid feed, even though the latter is quite thick in its consistency, and the heating of the tank's contents is also facilitated as compared with other delivery means such as more exposed spouts or conduits.

Having described my invention, what I claim as new, and desire to secure by Letters Patent, is:

1. A device of the character described, comprising a container with open top to receive liquid food, a closed tank supported rotatably above and to dip into said container and having a peripheral wall opening to be immersed therein in one position of the tank, a closure for said opening slidably mounted on the tank to be shifted to and fro circumferentially, and a flexible encompassing connection passed completely about the tank connected at its ends to opposite ends of the closure for manually shifting the closure from any part of the connection around said tank to open or closed positions.

2. In a device of the character described, an open top container for liquid food having apertures in opposite walls, and having an aperture in its bottom, and a T-shaped tubular distributer mounted in said container to be submerged in the liquid contents thereof, the opposite terminals of the distributer being sealed in and traversing the side wall apertures of the container to open without it to discharge into the interior of said device to warm the same, and the stem of the distributer being sealed in and traversing the bottom aperture of the container to open without, and heating means positioned below the open lower end of said distributer stem to direct a heated fluid through the distributer.

3. In a device of the character described, an open top container for liquid food having apertures in opposite walls, and having an aperture in its bottom, a T-shaped tubular distributer mounted in said container to be submerged in the liquid contents thereof, the opposite terminals of the distributer being sealed in and traversing the side wall apertures of the container to open therethrough to discharge into the interior of the device to warm the tank therein, and the stem of the distributer being sealed in and traversing the bottom aperture of the conduit to open without, heating means positioned below the open lower end of said distributer to directed heated fluid through the distributer, a rotatable closed tank supported removably above said container and having a wall opening adapted to dip within the same through the whole length of the tank when in one position, a removable closure for said opening, means for manually shifting said closure to an open or a closed position, a housing about said container, tank and heating means having a wall aperture adjacent one side wall of the container, said housing having a top opening, a hopper removably mounted in said opening to direct liquid food through the wall opening of said tank when the latter has been rotated to one position, and means for releasably securing said tank in either position where its wall opening is uppermost to receive a charge or lowermost to deliver a charge into the container.

In testimony whereof I affix my signature.

CRENO P. BETTENGA.